United States Patent
Naganuma et al.

(10) Patent No.: US 10,474,617 B2
(45) Date of Patent: Nov. 12, 2019

(54) CONTROL METHOD FOR TRANSMISSION AND RECEPTION SYSTEM, TRANSMITTING APPARATUS, AND RECEIVING APPARATUS

(71) Applicant: FUJITSU LIMITED, Kawasaki-shi, Kanagawa (JP)

(72) Inventors: Masanori Naganuma, Yokohama (JP); Shigeki Sekine, Koutou (JP); Shotaro Nakayama, Kawasaki (JP); Satoru Nakano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/017,443

(22) Filed: Jun. 25, 2018

(65) Prior Publication Data

US 2019/0012289 A1 Jan. 10, 2019

(30) Foreign Application Priority Data

Jul. 4, 2017 (JP) .................................. 2017-131296

(51) Int. Cl.
*G06F 13/42* (2006.01)
*H04L 29/08* (2006.01)
(Continued)

(52) U.S. Cl.
CPC ........... *G06F 13/42* (2013.01); *H04B 1/0003* (2013.01); *H04L 67/34* (2013.01); *H04B 1/02* (2013.01);
(Continued)

(58) Field of Classification Search
None
See application file for complete search history.

(56) References Cited

U.S. PATENT DOCUMENTS

| | | |
|---|---|---|
| 5,204,950 A | 4/1993 | Kawashima |
| 6,898,638 B2 * | 5/2005 | Frazier .................. H04L 47/266 709/232 |

(Continued)

FOREIGN PATENT DOCUMENTS

| | | |
|---|---|---|
| JP | 63-291151 | 11/1988 |
| JP | 03-189752 | 8/1991 |
| JP | 10-091567 | 4/1998 |

*Primary Examiner* — Michael Sun
(74) *Attorney, Agent, or Firm* — Fujitsu Patent Center

(57) ABSTRACT

A control method includes: making, by a transmitting apparatus coupled to an information processing apparatus and provided in the transmission and reception system where the transmitting apparatus and a receiving apparatus coupled to an input and output apparatus are coupled with each other through a network, a response to the information processing apparatus in response to a first command received from the information processing apparatus; obtaining, by the transmitting apparatus, a commands from the information processing apparatus after receiving the first command; batch-transferring the commands to the receiving apparatus without making a response to the information processing apparatus; issuing, by the receiving apparatus, the commands transferred from the transmitting apparatus to the input and output apparatus; and notifying, by the receiving apparatus, when the commands is batch-transferred from the transmitting apparatus, the transmitting apparatus about processing completion when processing of all of the commands is completed.

14 Claims, 18 Drawing Sheets

(51) Int. Cl.
   *H04B 1/00*    (2006.01)
   *H04B 1/06*    (2006.01)
   *H04B 1/02*    (2006.01)
   *H04B 1/38*    (2015.01)
(52) U.S. Cl.
   CPC ............... *H04B 1/06* (2013.01); *H04B 1/38* (2013.01); *H04L 67/10* (2013.01); *H04L 69/326* (2013.01)

(56) References Cited

U.S. PATENT DOCUMENTS

| | | | | |
|---|---|---|---|---|
| 7,155,483 | B1* | 12/2006 | Friend | H04W 28/06 709/206 |
| 7,984,112 | B2* | 7/2011 | Huang | H04L 67/2847 709/218 |
| 8,904,050 | B1* | 12/2014 | Raizen | G06F 3/0635 710/10 |
| 2007/0223521 | A1* | 9/2007 | Teruyama | G06F 21/72 370/463 |
| 2008/0126616 | A1* | 5/2008 | Kumasawa | G06F 1/3221 710/42 |
| 2008/0147902 | A1* | 6/2008 | Ishii | G06F 11/0727 710/19 |
| 2008/0313518 | A1* | 12/2008 | Naoe | H04L 1/16 714/748 |
| 2011/0296129 | A1* | 12/2011 | Arai | G06F 13/28 711/165 |
| 2012/0069029 | A1* | 3/2012 | Bourd | G06F 9/546 345/502 |
| 2012/0317385 | A1* | 12/2012 | Driever | G06F 13/126 711/165 |
| 2015/0205650 | A1* | 7/2015 | Shimada | G06F 11/004 714/703 |
| 2016/0371145 | A1* | 12/2016 | Akutsu | G06F 3/0619 |
| 2017/0154093 | A1* | 6/2017 | Shetty | G06F 3/065 |
| 2018/0046404 | A1* | 2/2018 | Jin | G06F 3/061 |

* cited by examiner

FIG. 6

| COMMAND TYPE | I/O APPARATUS TYPE | | |
| --- | --- | --- | --- |
| | TAPE APPARATUS | PRINTER APPARATUS | CONSOL APPARATUS |
| WRITE TYPE | PERFORM PREFETCH | | |
| READ TYPE | PERFORM PREFETCH VIA PRE-READING FOR ONLY READ COMMAND | FETCH CCW COMMANDS ONE BY ONE WITHOUT PREFETCH | |
| SENSE TYPE | FETCH CCW COMMANDS ONE BY ONE WITHOUT PREFETCH | PERFORM PREFETCH FOR ONLY SIB COMMAND | FETCH CCW COMMANDS ONE BY ONE WITHOUT PREFETCH |
| READ BACKWARD TYPE | INOPERABLE | | |
| NOP TYPE | PERFORM PROCESSING BASED ON NOP SYNCHRONIZATION WHEN CORRESPONDING NOP IS LAST CCW COMMAND. | | |

FIG. 12

| PREVIOUS CCW COMMAND / SUBSEQUENT CCW COMMAND | | WRITE TYPE | NOP (*1) | READ TYPE | | SENSE TYPE | | READ BACKWARD TYPE |
|---|---|---|---|---|---|---|---|---|
| | | | | TAPE AND READ | OTHER THAN STATED IN LEFT COLUMN | PRINTER AND SIB | OTHER THAN STATED IN LEFT COLUMN | |
| WRITE | | | CONTINUE | CONTINUE | SUSPEND | CONTINUE | SUSPEND | SUSPEND |
| NOP | | CONTINUE (*2) | | CONTINUE | SUSPEND | CONTINUE | SUSPEND | SUSPEND |
| READ | TAPE AND READ | SUSPEND | CONTINUE (*2) | | SUSPEND | | SUSPEND | SUSPEND |
| | OTHER THAN STATED IN ABOVE ROW | N/A | N/A | N/A | | N/A | SUSPEND | N/A |
| SENSE | PRINTER AND SIB | CONTINUE | CONTINUE | N/A | SUSPEND | | SUSPEND | SUSPEND |
| | OTHER THAN STATED IN ABOVE ROW | N/A | N/A | N/A | N/A | N/A | | N/A |
| READBACKWARD | | N/A | N/A | N/A | N/A | N/A | N/A | |

…

CONTROL METHOD FOR TRANSMISSION AND RECEPTION SYSTEM, TRANSMITTING APPARATUS, AND RECEIVING APPARATUS

CROSS-REFERENCE TO RELATED APPLICATION

This application is based upon and claims the benefit of priority of the prior Japanese Patent Application No. 2017-131296, filed on Jul. 4, 2017, the entire contents of which are incorporated herein by reference.

FIELD

The embodiment discussed herein is related to a control method for a transmission and reception system, a transmitting apparatus, and a receiving apparatus.

BACKGROUND

A host (information processing apparatus), such as a server, and an input and output (I/O) apparatus are provided at a distance of about 100 m for BMC (Block Multiplexer Channel) connection using an electrically conductive cable, and are provided at a distance of several kilometers for OCLINK (Optical Channel LINK) connection using an optical fiber cable.

A related technology is disclosed in Japanese Laid-open Patent Publication No. 3-189752, Japanese Laid-open Patent Publication No. 63-291151, or Japanese Laid-open Patent Publication No. 10-91567.

SUMMARY

According to an aspect of the embodiments, a control method for a transmission and reception system, the control method includes: making, by a transmitting apparatus coupled to an information processing apparatus and provided in the transmission and reception system where the transmitting apparatus and a receiving apparatus coupled to an input and output apparatus are coupled with each other through a network, a response to the information processing apparatus in response to a first command received from the information processing apparatus and to be issued to the input and output apparatus; obtaining, by the transmitting apparatus, a plurality of commands from the information processing apparatus after receiving the first command; batch-transferring the plurality of commands to the receiving apparatus without making a response to the information processing apparatus; issuing, by the receiving apparatus, the commands transferred from the transmitting apparatus to the input and output apparatus; and notifying, by the receiving apparatus, when the plurality of commands is batch-transferred from the transmitting apparatus, the transmitting apparatus about processing completion when processing of all of the plurality of commands is completed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates exemplary prefetch control on commands;

FIG. 12 illustrates exemplary prefetch control when command types are mixed;

DESCRIPTION OF EMBODIMENTS

For example, a system may be provided in which extending apparatuses are used to extend a communication channel between a host (an information processing apparatus) and an input and output apparatus (I/O apparatus) to thereby enable operation between long distance bases.

Figure 18:
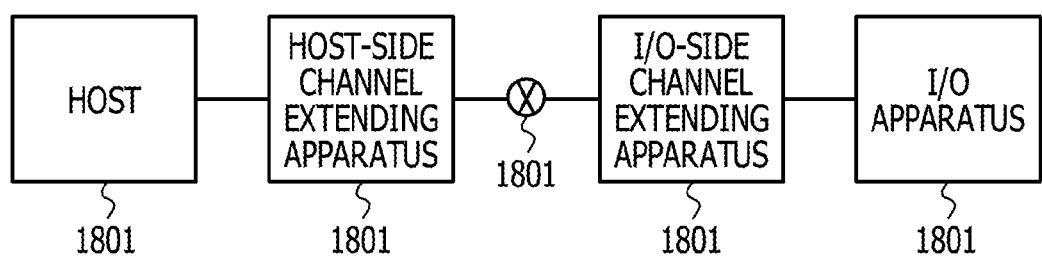
FIG. 18 illustrates an exemplary system in which extending apparatuses are provided between a host and an I/O apparatus.

FIG. 18 illustrates an exemplary system in which extending apparatuses are used to extend a communication channel. In the system illustrated in FIG. 18, channel extending apparatuses 1803 and 1804 are provided between a host (an information processing apparatus) 1801 and an input and output apparatus (I/O apparatus) 1802, and the channel extending apparatuses 1803 and 1804 are connected to each other through a network 1805, such as a wide-area Ethernet® or the like. The host 1801 and the host-side channel extending apparatus 1803 are connected to each other through BMC connection or OCLINK connection, which has a distance limitation, and the I/O apparatus 1802 and the I/O-side channel extending apparatus 1804 are connected to each other through BMC connection or OCLINK connection. However, the channel extending apparatuses 1803 and 1804 are connected to each other through the network 1805, such as a wide-area Ethernet or the like, which has no distance limitation, to thereby enable operation between long distance bases.

The host-side channel extending apparatus 1803 operates as a pseudo I/O apparatus to the host 1801, and the I/O-side channel extending apparatus 1804 operates as a pseudo host to the I/O apparatus 1802. For example, the host-side channel extending apparatus 1803 makes, to the host 1801, a pseudo response to a command sent from the host 1801 to the I/O apparatus 1802, and transfers a group of commands from the host 1801 to the I/O-side channel extending apparatus 1804. The I/O-side channel extending apparatus 1804 issues the group of commands, transferred from the host-side channel extending apparatus 1803, to the I/O apparatus

1802, and after the I/O apparatus 1802 executes the group of commands, the I/O-side channel extending apparatus 1804 reports a last status, sent from the I/O apparatus 1802, to the host 1801 via the host-side channel extending apparatus 1803. The number of round-trip communications through a channel is reduced in the manner described above, and a performance decline due to channel delay is avoided.

In the system illustrated in FIG. 18, when a plurality of commands is batch-transferred for processing, communication between the host 1801 and the I/O apparatus 1802 is disconnected by the channel extending apparatuses 1803 and 1804 and the network 1805, and thus timings of the command processing are not synchronized with each other. Accordingly, for example, for recovery processing during occurrence of an abnormality, software that runs on the host 1801 and the channel extending apparatuses 1803 and 1804 perform abnormality analysis in cooperation with each other to identify an abnormal spot to thereby perform the recovery processing. For example, a system may be provided in which extending apparatuses that connect to each other through a network are provided between a host (an information processing apparatus) and an I/O apparatus (an input and output apparatus) and in which the timings of command processing can be synchronized with each other.

A transmission and reception system in an embodiment of the present disclosure is a remote channel scheme system in which a host (an information processing apparatus), such as a server, is connected to a host-side extending apparatus, an I/O apparatus (an input and output apparatus) is connected to an I/O-side extending apparatus, and the host-side extending apparatus and the I/O-side extending apparatus are connected to each other through a network, such as a wide-area Ethernet. In addition, in order to absorb a difference in the command processing timings which is caused by disconnection of communication between the host (the information processing apparatus) and the I/O apparatus (the input and output apparatus) by the extending apparatuses and the network, processing for command synchronization is incorporated into the extending apparatuses so as to allow normal communication and recovery processing to be performed without depending on software that runs on the host.

Security of commands and data requested by the software, guarantee of user data, and recovery processing are generalized in order to achieve command synchronization between the software that runs on the host and the I/O apparatus. This can be realized by satisfying conditions <1>, <2>, and <3> below.

<1> Since the software has a limited time for an initial command response, a response is returned within the period of a response monitor timer in response to a command initial launch from the software to thereby suppress occurrence of response timeout.

<2> In order to ensure validity of command processing between the software and the I/O apparatus and to ensure synchronization between the software and the I/O apparatus about an abnormality occurrence spot when an abnormality occurs, a group of commands received from the software is directly sent to the I/O apparatus without making a pseudo response (proxy response).

<3> In order to ensure that provision of the extending apparatuses between the software and the I/O apparatus does not cause data corruption of user data, write data from the software and read data from the I/O apparatus are ensured.

In order to satisfy the above-described conditions, the transmission and reception system in the present embodiment has functions described below.

Initial-Launch Pseudo Response Function (Condition <1>)

In order to return a response within the period of the response monitor timer for a command initial launch from the software, the host-side extending apparatus uses an initial-launch pseudo response function to return a response in a pseudo manner to the software in response to a command initial launch from the software, thereby making a response within the limited time of the response monitor timer.

Batch Data Transfer Function (Condition <2>)

A batch data transfer function is implemented for communication between the host-side extending apparatus and the I/O-side extending apparatus to thereby reduce the amount of response waiting, thereby realizing synchronization communication of command processing between the host side and the I/O side. The host-side extending apparatus prefetches a plurality of commands from the software and batch-transfers the commands to the I/O-side extending apparatus without making a pseudo response to the software related to the commands. The batch data transfer function may be realized, for example, by using a high-speed transfer function (prefetch function) for communication that complies with the Fibre Channel Single Byte (FC-SB)-2 standard.

Data Corruption Inhibition Function (Condition <3>)

A data corruption inhibition function is implemented to ensure data security in processing corresponding to a group of commands transferred by the batch data transfer function.

Figure 1:
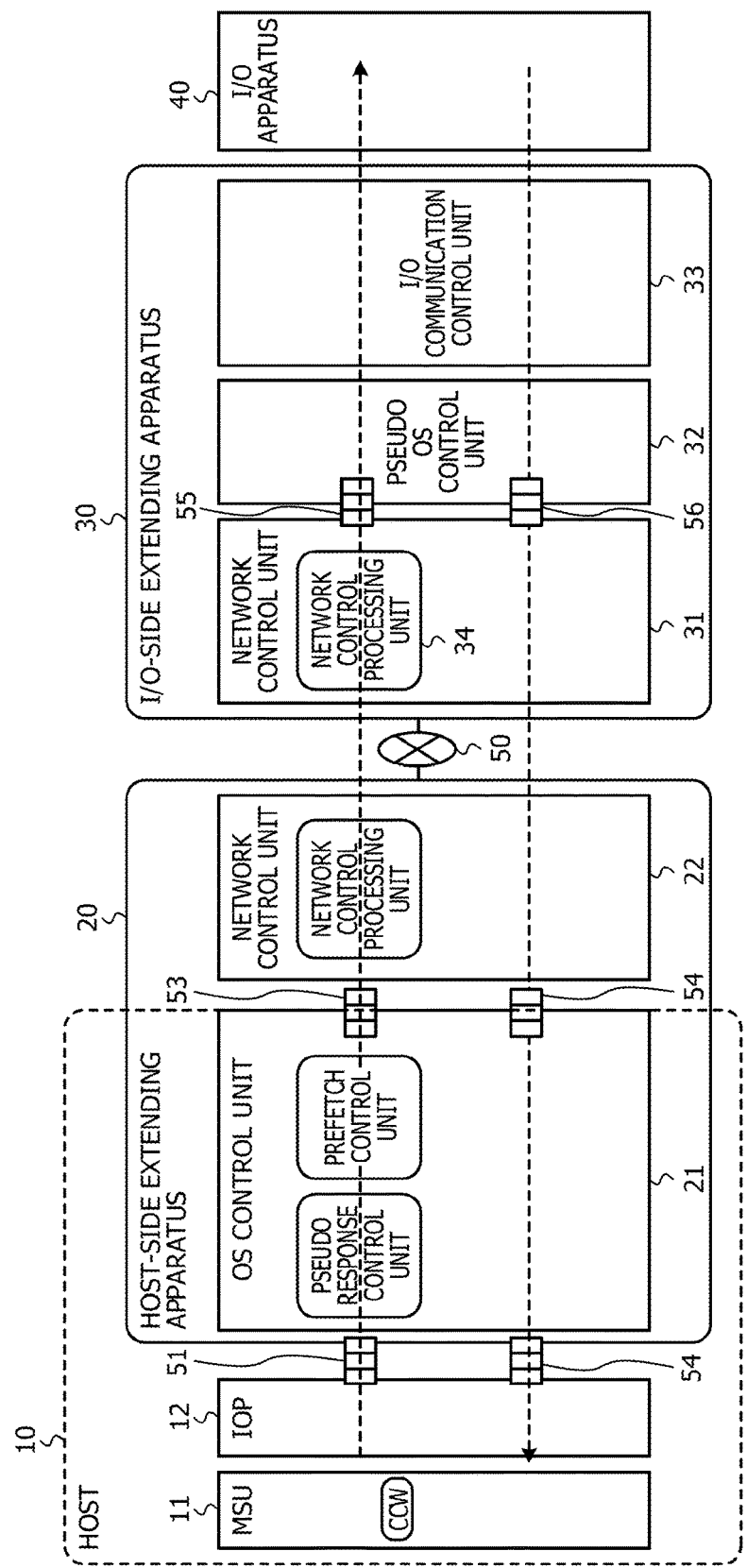
FIG. 1 illustrates an exemplary transmission and reception system.

FIG. 1 illustrates an exemplary transmission and reception system. In the transmission and reception system, a host 10, such as a server, is connected to a host-side extending apparatus 20, and an I/O apparatus 40 is connected to an I/O-side extending apparatus 30. The host-side extending apparatus 20 and the I/O-side extending apparatus 30 are connected to each other through a network 50, such as a wide-area Ethernet.

The host 10 is an information processing apparatus and has a memory unit (MSU) 11 and an input and output control unit (IOP) 12. Although not illustrated in FIG. 1, the host 10 also has other functional units, such as a central processing unit (CPU), for executing the software. Channel command word (CCW) commands 13 for giving instructions for input and output operations or the like in the I/O apparatus 40, the instructions being issued from the software that runs on the host 10, are stored in the MSU 11. The IOP 12 controls input and output of commands, data, and so on between the software that runs on the host 10 and the host-side extending apparatus 20.

The host-side extending apparatus (a transmitting-end channel extending apparatus) 20 serves as a transmitting apparatus and has an OS control unit 21 and a network control unit 22. The OS control unit 21 includes a pseudo response control unit 23 and a prefetch control unit 24 and controls processing on the software that runs on the host 10. The pseudo response control unit 23 is an example of a responding unit, and the prefetch control unit 24 is an example of a transfer unit.

The pseudo response control unit 23 controls a pseudo response to a command from the software. For example, for transferring a group of commands by using the batch data transfer function, the pseudo response control unit 23 returns, to the software, a response to a command initial launch from the software, in order to inhibit response timeout of the software. The pseudo response control unit 23 returns the response to the command initial launch within the period of the response monitor timer for the command initial launch from the software.

The prefetch control unit 24 controls batch transfer of a group of commands which uses the batch data transfer function. The prefetch control unit 24 prefetches a plurality of commands from the MSU 11 and batch-transfers the prefetched group of commands without making a pseudo response for each command. The prefetch control unit 24 batch-transfers the group of commands, for example, by using a high-speed transfer function (prefetch function) for communication that complies with the FC-SB-2 standard. The prefetch control unit 24 also performs processing related to a read-data corruption inhibition function in read processing corresponding to the group of commands transferred using the batch data transfer function.

In order to perform control by sending control logic including batch data transfer control in the present embodiment via a Transmission Control Protocol/Internet Protocol (TCP/IP) frame, the network control unit 22 controls network communication for TCP session management and so on in the network 50. The network control unit 22 includes a network control processing unit 25. The network control processing unit 25 performs control for exchanging, on a TCP session, communication protocols for realizing the batch data transfer function between the host-side extending apparatus 20 and the I/O-side extending apparatus 30.

The I/O-side extending apparatus (a receiving-side channel extending apparatus) 30 serves as a receiving apparatus and includes a network control unit 31, a pseudo OS control unit 32, and an I/O communication control unit 33. The pseudo OS control unit 32 is an example of a notifying unit, and the I/O communication control unit 33 is an example of a control unit. Similarly to the network control unit 22, the network control unit 31 controls network communication in the network 50. The network control unit 31 includes a network control processing unit 34. Similarly to the network control processing unit 25, the network control processing unit 34 performs control for exchanging, on a TCP session, communication protocols for realizing the batch data transfer function between the host-side extending apparatus 20 and the I/O-side extending apparatus 30.

The pseudo OS control unit 32 performs operation related to batch data transfer control in the I/O-side extending apparatus 30. The pseudo OS control unit 32 transfers a group of commands, received from the host-side extending apparatus 20 through the network 50, to the I/O communication control unit 33. The I/O communication control unit 33 communicates with the I/O apparatus 40 to issue, to the I/O apparatus 40, a command transferred from the pseudo OS control unit 32 or notifies the pseudo OS control unit 32 about a status obtained from the I/O apparatus 40.

A queue (CHSQ) 51 and a queue (CHRQ) 52 are provided between the IOP 12 in the host 10 and the OS control unit 21 in the host-side extending apparatus 20, and a queue (TXQC) 53 and a queue (RXQC) 54 are provided between the OS control unit 21 and the network control unit 22 in the host-side extending apparatus 20. A queue (TXQS) 55 and a queue (RXQS) 56 are provided between the network control unit 31 and the pseudo OS control unit 32 in the I/O-side extending apparatus 30. The provision of the queues 51 to 56 makes it possible isolate contexts between the functional units to make the functional units to operate asynchronously, thus making it possible to make the overall control efficient. The queues 51, 53, and 55 are provided in a transmission direction from the IOP 12 side to the I/O apparatus 40 side, and the queues 52, 54, and 56 are provided in a reception direction from the I/O apparatus 40 side to the IOP 12 side.

Figure 2:
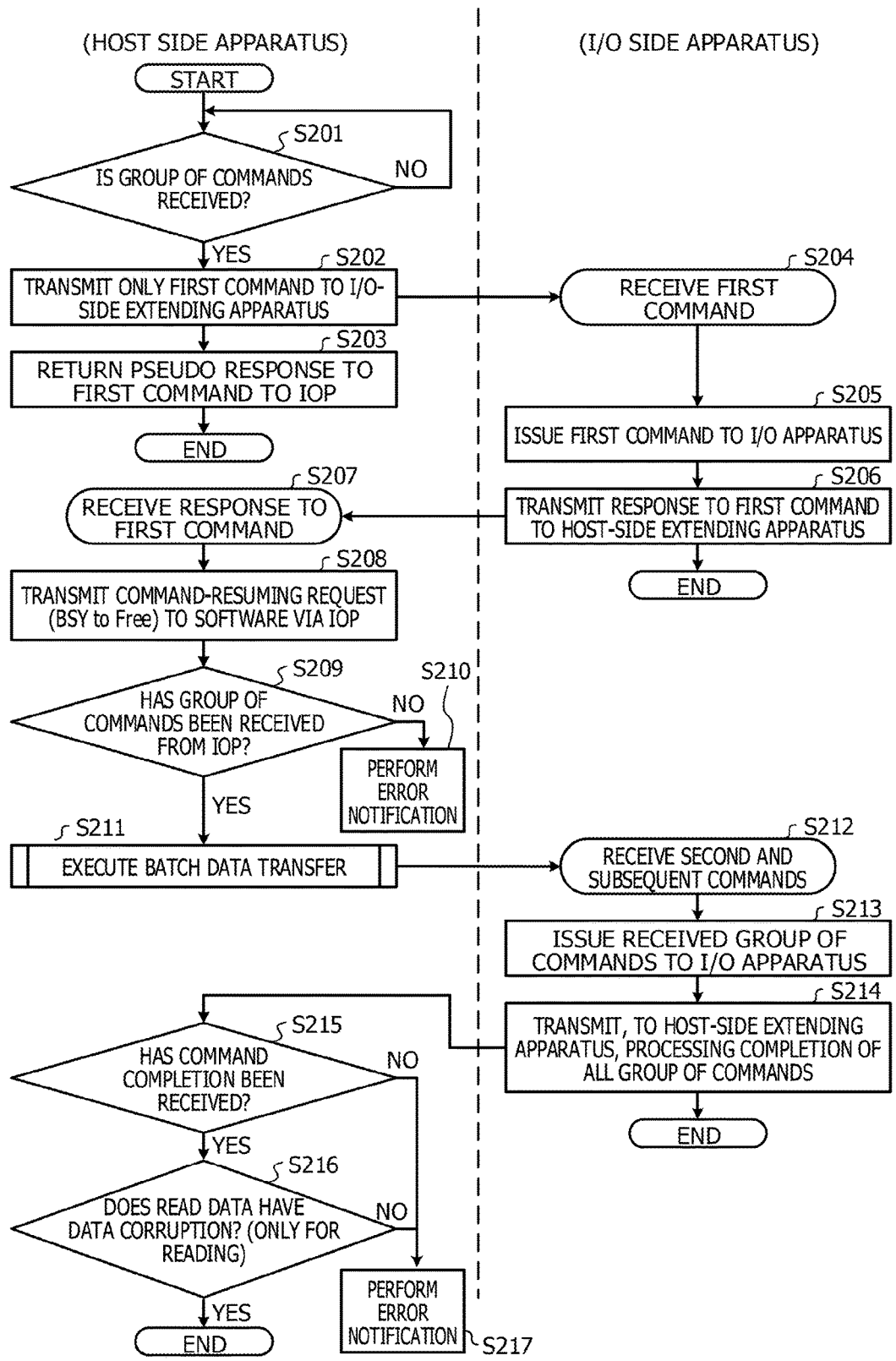
FIG. 2 illustrates exemplary operations in the transmission and reception system.

FIG. 2 illustrates exemplary operations in the transmission and reception system. FIG. 2 illustrates the operations of the host-side extending apparatus 20 and the I/O-side extending apparatus 30, when a group of commands is transferred using the batch data transfer function, and processing is performed. First, in step S201, the host-side extending apparatus 20 waits until it receives the group of commands from the IOP 12. When the host-side extending apparatus 20 receives the group of commands from the IOP 12, the process proceeds to step S202 in which the host-side extending apparatus 20 transmits only a first command in the received group of commands to the I/O-side extending apparatus 30. Subsequently, in step S203, the host-side extending apparatus 20 returns, to the IOP 12, a response (pseudo response) to the first command. Upon receiving the response (pseudo response), the software that runs on the host 10 clears the response monitor timer and waits for a command-resuming request from the I/O-side extending apparatus 30.

When the I/O-side extending apparatus 30 receives the first command transmitted from the host-side extending apparatus 20 in step S202 (S204), the process proceeds to step S205 in which the I/O-side extending apparatus 30 issues the received first command to the I/O apparatus 40. When the I/O-side extending apparatus 30 receives, from the I/O apparatus 40, a response to the first command, the process proceeds to step S206. In step S206, the I/O-side extending apparatus 30 transmits the response to the first command to the host-side extending apparatus 20.

When the host-side extending apparatus 20 receives the response to the first command transmitted from the I/O-side extending apparatus 30 in step S206 (S207), the process proceeds to step S208 in which the host-side extending apparatus 20 transmits a command-resuming request to the software via the IOP 12. Next, in step S209, the host-side extending apparatus 20 performs a prefetch operation and determines whether or not a group of commands has been received from the IOP 12.

When the host-side extending apparatus 20 determines that a group of commands has not been received, the process proceeds to step S210 in which the host-side extending apparatus 20 performs error notification. On the other hand, when the host-side extending apparatus 20 determines that a group of commands has been received, the process proceeds to step S211 in which the host-side extending apparatus 20 executes batch data transfer to transmit the group of commands, received from the IOP 12, to the I/O-side extending apparatus 30 by using the batch data transfer function.

When the I/O-side extending apparatus 30 receives a second and subsequent commands transmitted from the host-side extending apparatus 20 (S212), the process proceeds to step S213 in which the I/O-side extending apparatus 30 sequentially issues the received group of commands to the I/O apparatus 40. When the I/O-side extending apparatus 30 receives, from the I/O apparatus 40, a response to the group of commands issued in step S213, the process proceeds to step S214 in which the I/O-side extending apparatus 30 transmits, to the host-side extending apparatus 20, a processing completion of all the group of commands is completed.

In step S215, the host-side extending apparatus 20 determines whether or not the command completion (processing completion) has been received from the I/O-side extending apparatus 30. As a result, when the host-side extending apparatus 20 determines that a command completion from the I/O-side extending apparatus 30 has not been received until a predetermined time passes from when the group of commands is transmitted to the I/O-side extending apparatus 30 by using the batch data transfer function, the process proceeds to step S217 in which the host-side extending apparatus 20 performs error notification.

On the other hand, when the host-side extending apparatus 20 determines that a command completion from the I/O-side extending apparatus 30 has been received before the predetermined time passes from when the group of commands is transmitted to the I/O-side extending apparatus 30 by using the batch data transfer function, the process proceeds to step S216 in which the host-side extending apparatus 20 determines whether or not read data has data corruption. When processing corresponding to the group of commands is read processing, the process in step S216 is executed, and when processing corresponding to the group of commands is processing other than read processing, the operation is ended without executing the process in step S216.

When the host-side extending apparatus 20 determines that the read data has data corruption as a result of the determination in step S216, the process proceeds to step S217 in which the host-side extending apparatus 20 performs error notification. On the other hand, when the host-side extending apparatus 20 determines that the read data has no data corruption, the operation is ended.

Figure 3:
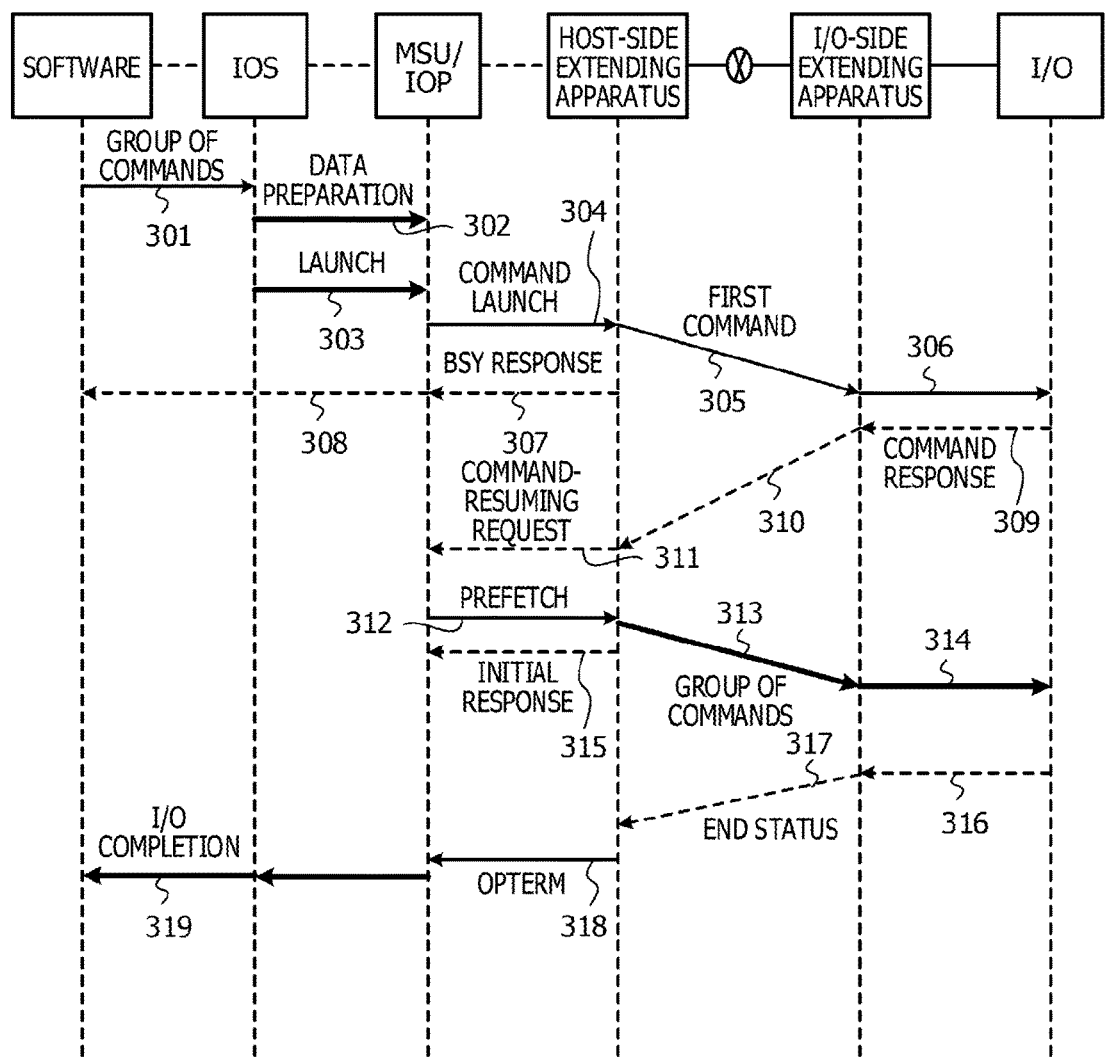
FIG. 3 illustrates an exemplary operation sequence of the transmission and reception system.

FIG. 3 illustrates an exemplary operation sequence of the transmission and reception system. The operation sequence illustrated in FIG. 3 is a sequence, when a group of commands is transferred using the batch data transfer function, and processing is performed. The software that runs on the host transmits a group of commands to the IOS (301), and the IOS prepares, for the MSU/IOP, data including the group of commands (302), and then issues a launch instruction (303). In this case, the IOS is software for performing CCW control on the software that runs on the host and the I/O apparatus. For example, for a write operation on the I/O apparatus, the group of commands corresponds to a first command and a plurality of write commands (for example, n write commands for n write processes).

Upon receiving the launch instruction, the MSU/IOP transmits the group of commands to the host-side extending apparatus (command launch) (304). The host-side extending apparatus transmits the first command in the group of commands to the I/O-side extending apparatus (305), and the I/O-side extending apparatus issues the received first command to the I/O apparatus (306). After transmitting the first command to the I/O-side extending apparatus, the host-side extending apparatus returns a response (a BSY response) to the software via the MSU/IOP (307 and 308). Upon receiving the response, the software clears the response monitor timer.

Upon receiving a response to the first command from the I/O apparatus (309), the I/O-side extending apparatus notifies the host-side extending apparatus about the response to the first command (310). When the host-side extending apparatus is notified about the response to the first command, the host-side extending apparatus transmits a command-resuming request (BSY to Free response) (311). The command-resuming request transmitted from the host-side extending apparatus is transmitted to the software via the MSU/IOP.

Thereafter, the host-side extending apparatus starts prefetch control to obtain, from the MSU/IOP, a group of commands to be batch-transferred (312). The host-side extending apparatus then batch-transfers the obtained group of commands to the I/O-side extending apparatus (313), and the I/O-side extending apparatus sequentially issues commands in the received group of commands to the I/O apparatus (314). In this case, the host-side extending apparatus directly transfers the obtained group of commands to the I/O-side extending apparatus without making a pseudo response to each command in the group of commands obtained from the MSU/IOP and returns only an initial response to the group of commands to the MSU/IOP (315).

When all processing corresponding to the batch-transferred group of commands is completed, the I/O apparatus notifies the I/O-side extending apparatus about an end status (316), and the I/O-side extending apparatus notifies the host-side extending apparatus about the end status (317). When the I/O side notifies the host-side extending apparatus about the end status, the host-side extending apparatus transmits a processing completion notification (OPTERM) (318). The processing completion notification (OPTERM) transmitted from the host-side extending apparatus is transmitted to the software via the MSU/IOP as an I/O completion notification, and the processing corresponding to the group of commands is completed (319).

When the I/O apparatus completes all processing corresponding to the batch-transferred group of commands, the I/O apparatus notifies the I/O-side extending apparatus about the end status, and when an event, such as an abnormality, occurs in the middle of processing corresponding to the batch-transferred group of commands, the I/O apparatus notifies the I/O-side extending apparatus about a status (such as abnormality) as status information of the command with which the event occurred.

As described above, without making a pseudo response to each command in the group of commands which is obtained by prefetch control and that is to be batch-transferred, the host-side extending apparatus directly transfers the group of commands to the I/O-side extending apparatus. Then, when the I/O apparatus completes all processing corresponding to the group of commands, the I/O side notifies the host side about an end status, and when an event, such as an abnormality, occurs in the I/O apparatus in the middle of the processing corresponding to the group of commands, the I/O side notifies the host side about a status (such as an abnormality) as status information of a command with which the event occurred.

Accordingly, a plurality of commands can be batch-transferred and can be continuously processed, and when a plurality of commands is batch-transferred for I/O processing, the timings of command processing can be synchronized with each other between the host and the I/O apparatus. Since the timings of the command processing can be synchronized with each other, for example, recovery processing in which application software is aware of apparatus operations can be omitted, conditions for applications whose usage conditions have been strict heretofore can be relaxed, and system convenience can be improved.

The initial-launch pseudo response function is realized by the pseudo response control unit 23 in the OS control unit 21 in the host-side extending apparatus 20 and the pseudo OS control unit 32 in the I/O-side extending apparatus 30.

Figure 4:
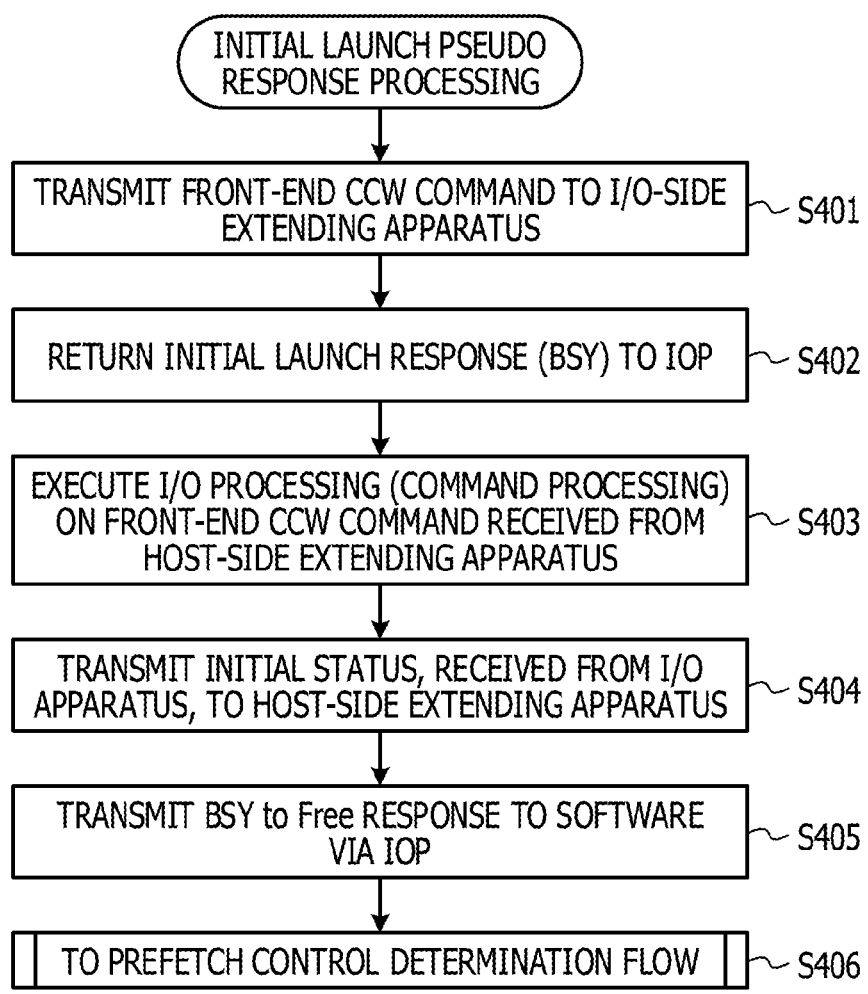
FIG. 4 illustrates exemplary initial launch pseudo response processing.

FIG. 4 illustrates exemplary initial launch pseudo response processing. In the initial launch pseudo response processing, in step S401, the host-side extending apparatus 20 transmits, to the I/O-side extending apparatus 30, a front-end (first) CCW command in a group of CCW commands from the IOP 12. Next, in step S402, the host-side extending apparatus 20 returns an initial launch response (BSY response) to the IOP 12. Upon receiving the response, the software that runs on the host 10 clears the response monitor timer.

In step S403, the I/O-side extending apparatus 30 issues, to the I/O apparatus 40, an instruction for executing I/O processing (command processing) corresponding to the front-end CCW command received from the host-side extending apparatus 20, and the I/O apparatus 40 executes the I/O processing (command processing). In step S404, the I/O-side extending apparatus 30 receives, from the I/O apparatus 40, an initial status regarding the I/O processing (command processing) and transmits the received initial status to the host-side extending apparatus 20.

When the host-side extending apparatus 20 receives the initial status transmitted from the I/O-side extending apparatus 30, the process proceeds to step S405 in which the host-side extending apparatus 20 transmits a command-resuming request (BSY to Free response) to the software via the IOP 12. The host-side extending apparatus 20 then advances to a prefetch control determination flow illustrated in FIG. 7 (S406).

Figure 5:
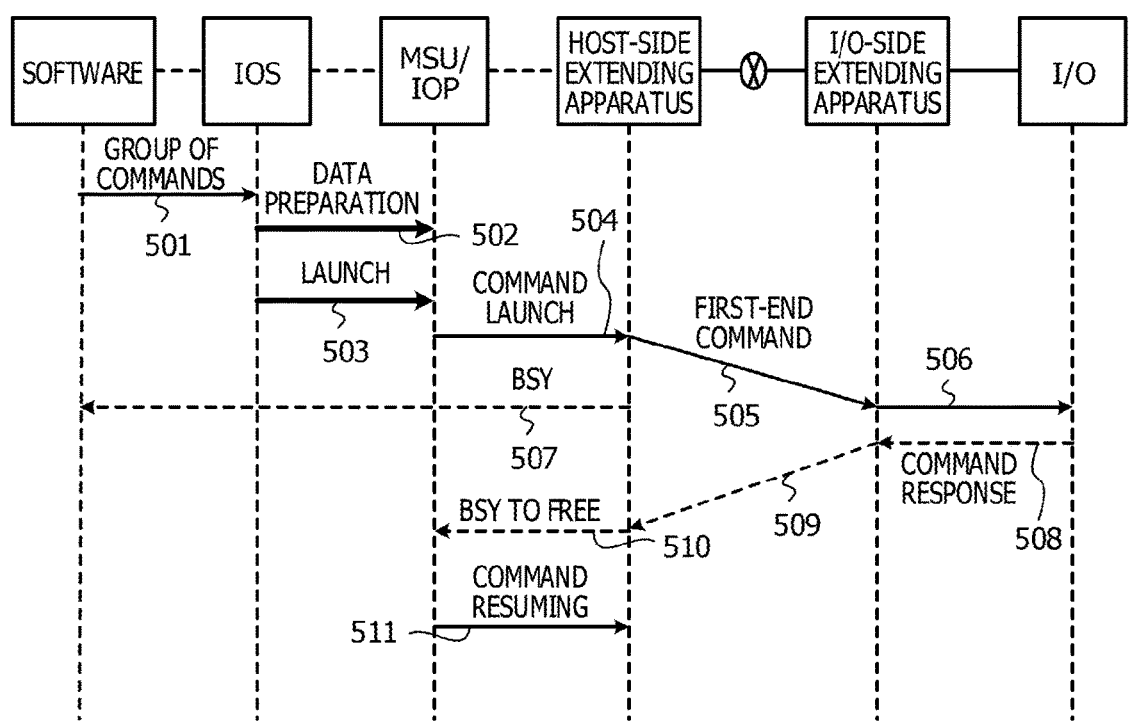
FIG. 5 illustrates exemplary initial launch pseudo response processing.

FIG. 5 illustrates exemplary initial launch pseudo response processing. The software that runs on the host transmits a group of CCW commands to the IOS (501), the IOS prepares, for the MSU/IOP, data including the group of CCW commands (502), and then issues a launch instruction (503). Upon receiving the launch instruction, the MSU/IOP transmits the group of CCW commands to the host-side extending apparatus (command launch) (504).

The host-side extending apparatus transmits a front-end CCW command to the I/O-side extending apparatus (505), and the I/O-side extending apparatus issues the received CCW command to the I/O apparatus. Upon transmitting the front-end CCW command to the I/O-side extending apparatus, the host-side extending apparatus returns a response (BSY response) to the software via the MSU/IOP (507). Upon receiving the response, the software clears the response monitor timer.

When the I/O-side extending apparatus receives, from the I/O apparatus, a response (an initial status) to the front-end CCW command (508), the I/O-side extending apparatus notifies the host-side extending apparatus about the received response (the initial status) (509). Upon receiving the initial status from the I/O apparatus, the host-side extending apparatus transmits a command-resuming request (BSY to Free response) (510). A command resuming instruction is issued to the host-side extending apparatus as a response to the command-resuming request transmitted from the host-side extending apparatus (511).

The batch data transfer function is realized by the prefetch control unit 24 in the OS control unit 21 in the host-side extending apparatus 20 and the pseudo OS control unit 32 in the I/O-side extending apparatus 30. The data corruption inhibition function in the present embodiment is realized by the prefetch control unit 24 in the OS control unit 21 in the host-side extending apparatus 20.

The host-side extending apparatus 20 performs prefetch control, for example, as illustrated in FIG. 6. When the command type is a write type, the host-side extending apparatus 20 prefetches CCW commands, regardless of the type of I/O apparatus. In a case in which the command type is a read type, when the type of I/O apparatus is a tape apparatus, and commands in question are read commands, the host-side extending apparatus 20 prefetches the CCW commands. Otherwise, the host-side extending apparatus 20 fetches the CCW commands one by one without performing prefetching.

In a case in which the command type is a sense type, when the type of I/O apparatus is a printer apparatus, and commands in question are sense intermediate buffer (SIB) commands, the host-side extending apparatus 20 prefetches the CCW commands. Otherwise, the host-side extending apparatus 20 fetches the CCW commands one by one without performing prefetching. In prefetch control for SIB commands, a data corruption inhibition function described below does not operate.

When the command type is "no operation (NOP)", the host-side extending apparatus 20 prefetches the CCW commands, regardless of the type of I/O apparatus. When the NOP command is a last CCW command, NOP synchronization processing is performed. The NOP synchronization processing is processing for prefetching commands up to the NOP command, which is the last CCW command, launching CCW commands up to the immediately previous CCW command, and then performing re-fetching from the position of the NOP command after finishing all I/O processing of the launched CCW commands.

In accordance with prefetch control as illustrated in FIG. 6, the host-side extending apparatus 20 prefetches the CCW commands as long as a chain continues, and batch-transfers the prefetched group of CCW commands to the I/O apparatus side. This makes it possible to sequentially transmit the same CCW command and makes it possible to ensure data transfer performance of the entire system while achieving synchronization of commands among the software, the extending apparatus, and the I/O apparatus.

Figure 7:
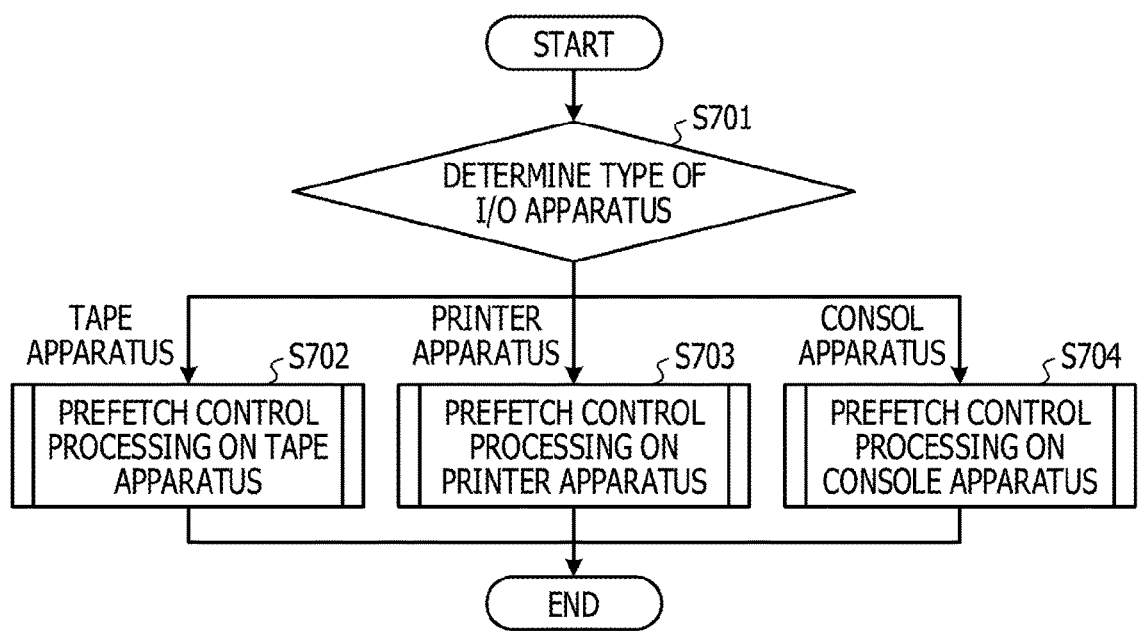
FIG. 7 illustrates exemplary prefetch control determination processing.

FIG. 7 illustrates exemplary prefetch control determination processing for realizing the prefetch control illustrated in FIG. 6. When the prefetch control determination processing is started, in step S701, the host-side extending apparatus 20 determines the type of I/O apparatus, which is a target of an input and output operation according to CCW commands. When the host-side extending apparatus 20 determines that the I/O apparatus to be instructed to perform an input and output operation is a tape apparatus, the process proceeds to step S702 in which the host-side extending apparatus 20 executes prefetch control processing on the tape apparatus illustrated in FIG. 8.

Figure 9:
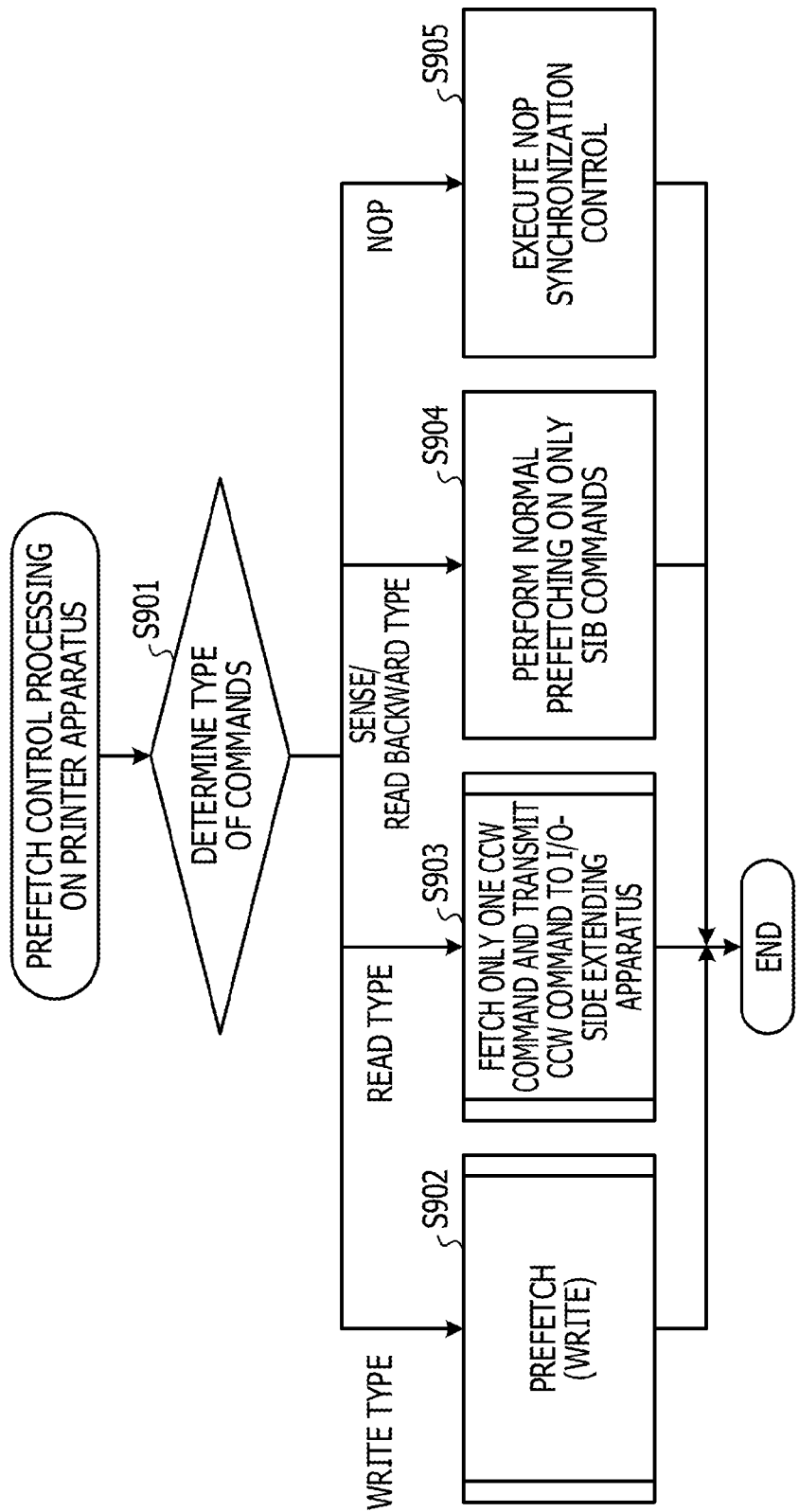
FIG. 9 illustrates exemplary prefetch control processing.

When the host-side extending apparatus 20 determines that the I/O apparatus to be instructed to perform an input and output operation is a printer apparatus, the process proceeds to step S703 in which the host-side extending apparatus 20 executes prefetch control processing on the printer apparatus illustrated in FIG. 9. When the host-side extending apparatus 20 determines that the I/O apparatus to be instructed to perform an input and output operation is a console apparatus, the process proceeds to step S704 in which the host-side extending apparatus 20 executes prefetch control processing on the console apparatus illustrated in FIG. 10.

Figure 8:
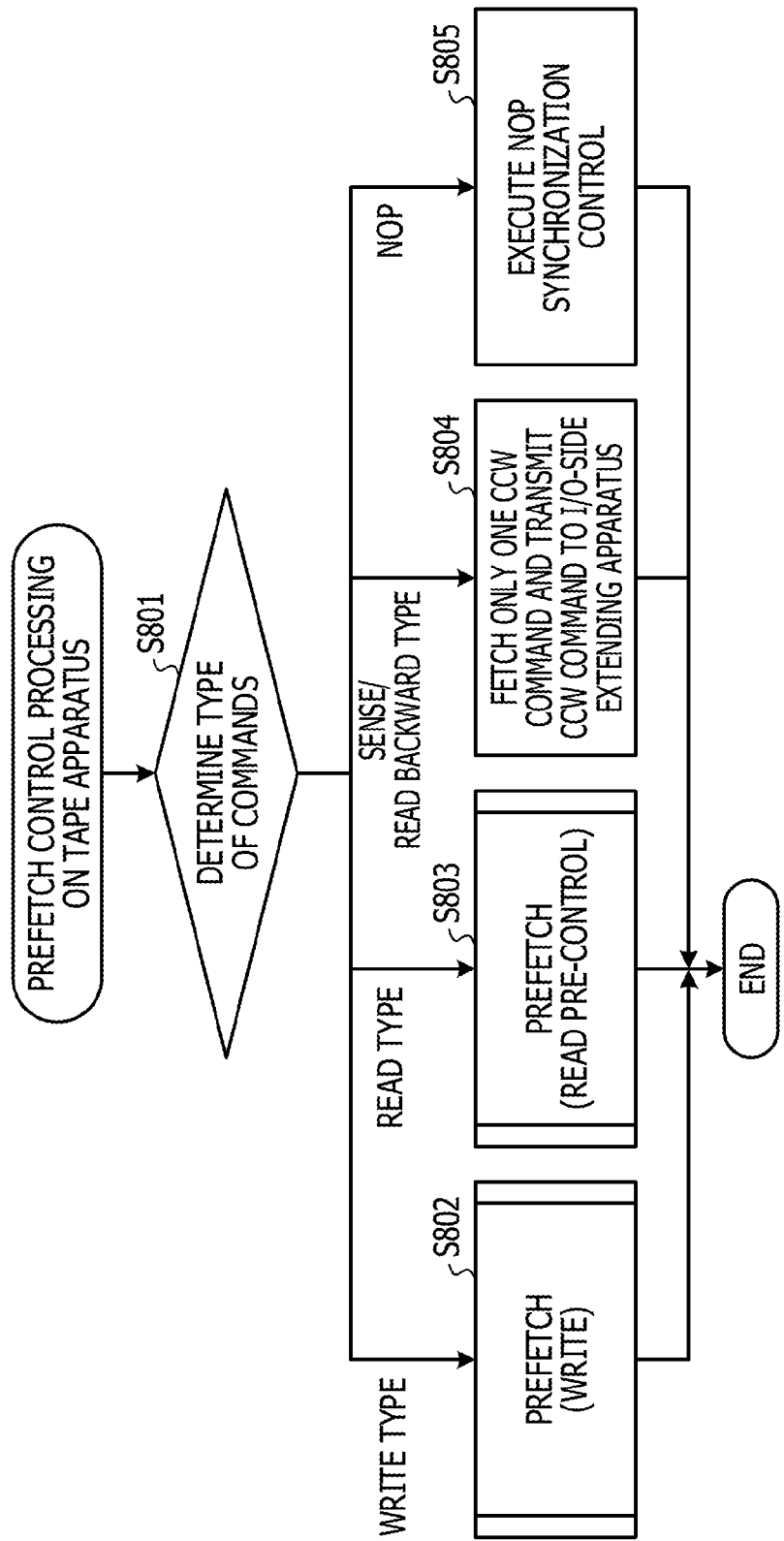
FIG. 8 illustrates exemplary prefetch control processing.

FIG. 8 illustrates exemplary prefetch control processing on the tape apparatus, the processing being executed in step S702 illustrated in FIG. 7. When the prefetch control processing on the tape apparatus is started, the process proceeds to step S801 in which the host-side extending apparatus 20 determines the type of CCW commands. Upon determining that the CCW commands are write-type commands, the process proceeds to step S802 in which the host-side extending apparatus 20 executes write prefetch processing illustrated in FIG. 11.

Figure 13:
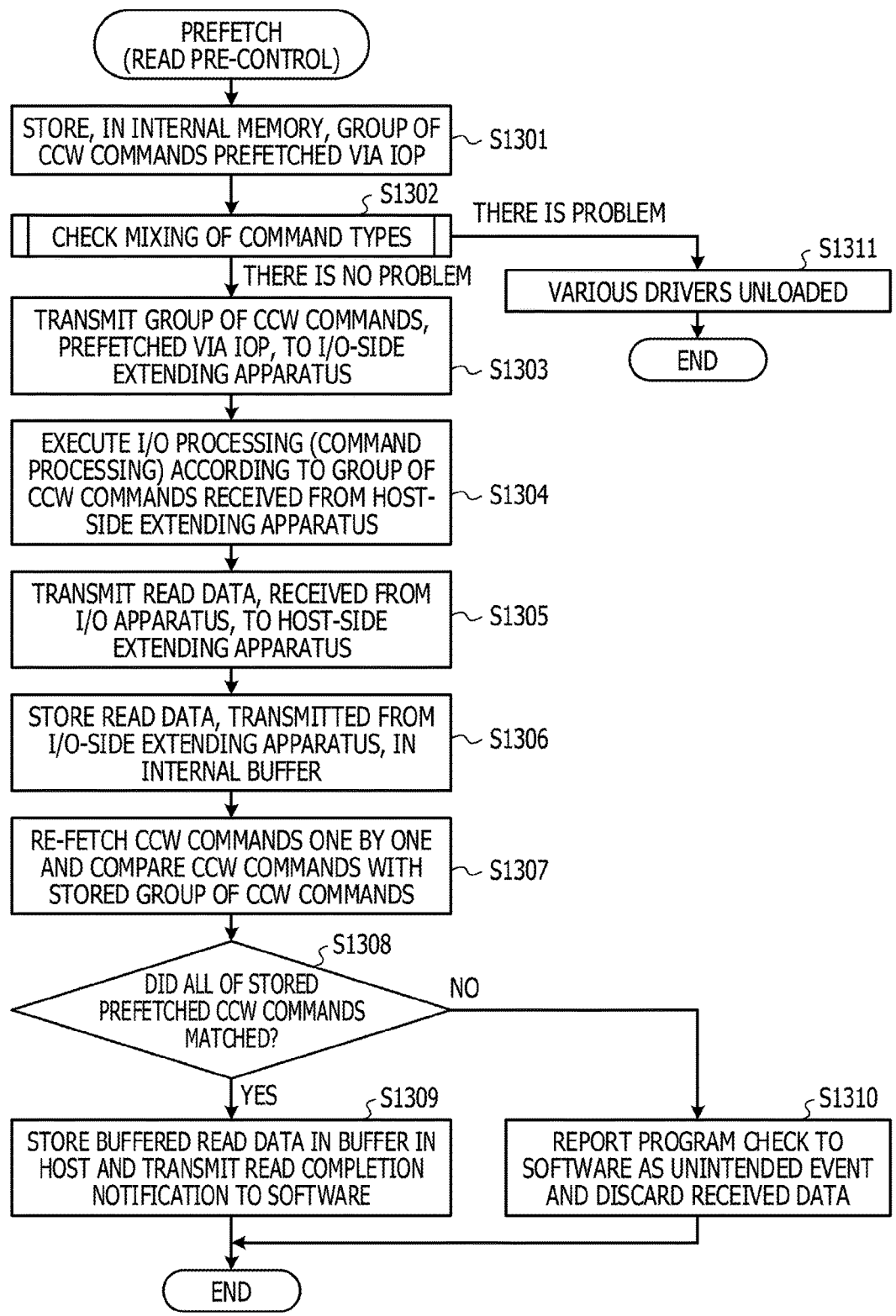
FIG. 13 illustrates exemplary read prefetch processing.

When the host-side extending apparatus 20 determines that the CCW commands are read-type commands (however, only read commands), the process proceeds to step S803 in which the host-side extending apparatus 20 executes prefetch processing based on read pre-control illustrated in FIG. 13. When the host-side extending apparatus 20 determines that the CCW commands are sense-type commands or read-backward-type commands, the process proceeds to step S804 in which the host-side extending apparatus 20 fetches one CCW command and transmits the CCW command to the I/O-side extending apparatus 30. When the host-side extending apparatus 20 determines that the CCW commands are NOP commands, the process proceeds to step S805 in which the host-side extending apparatus 20 executes NOP synchronization control.

FIG. 9 illustrates exemplary prefetch control processing on a printer apparatus, the processing being executed in step S703 illustrated in FIG. 7. When the prefetch control processing on the printer apparatus is started, the process proceeds to step S901 in which the host-side extending apparatus 20 determines the type of CCW commands. When the host-side extending apparatus 20 determines that the CCW commands are write-type commands, the process proceeds to step S902 in which the host-side extending apparatus 20 executes write prefetch processing illustrated in FIG. 11.

When the host-side extending apparatus 20 determines that the CCW commands are read-type commands, the process proceeds to step S903 in which the host-side extending apparatus 20 fetches one CCW command and transmits the CCW command to the I/O-side extending apparatus 30. When the host-side extending apparatus 20 determines that the CCW commands are sense-type commands or read-backward-type commands, the process proceeds to step S904. When the CCW commands are SIB commands, in step S904, the host-side extending apparatus 20 prefetches the CCW commands. Otherwise, the host-side extending apparatus 20 fetches one CCW command and transmits the CCW command to the I/O-side extending apparatus 30. When the host-side extending apparatus 20 determines that the CCW commands are NOP commands, the process proceeds to step S905 in which the host-side extending apparatus 20 executes NOP synchronization control.

Figure 10:
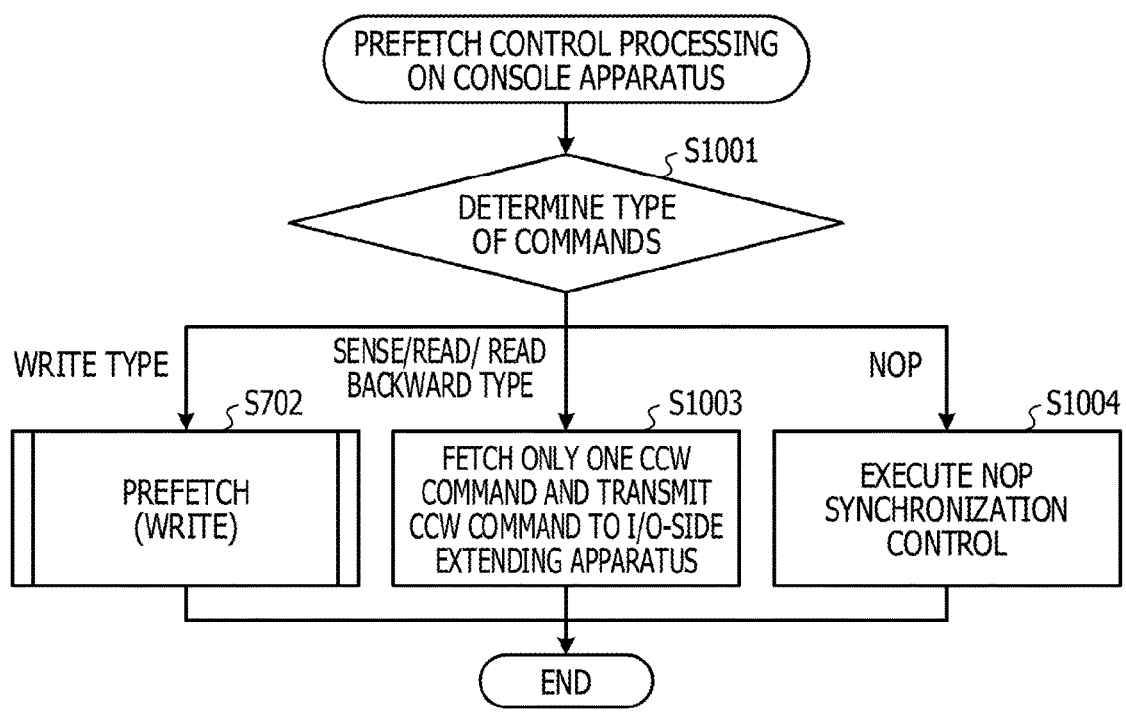
FIG. 10 illustrates exemplary prefetch control processing.

FIG. 10 illustrates exemplary prefetch control processing on the console apparatus, the processing being execution in step S704 illustrated in FIG. 7. When the prefetch control processing on the console apparatus is started, the process proceeds to step S1001 in which the host-side extending apparatus 20 determines the type of CCW commands. When the host-side extending apparatus 20 determines that the CCW commands are write-type commands, the process proceeds to step S1002 in which the host-side extending apparatus 20 executes write prefetch processing illustrated in FIG. 11.

When the host-side extending apparatus 20 determines that the CCW commands are read type, sense type, or read-backward-type commands, the process proceeds to step S1003 in which the host-side extending apparatus 20 fetches one CCW command and transmits the CCW command to the I/O-side extending apparatus 30. When the host-side extending apparatus 20 determines that the CCW commands is NOP commands, the process proceeds to step S1004 in which the host-side extending apparatus 20 executes NOP synchronization control.

Figure 11:
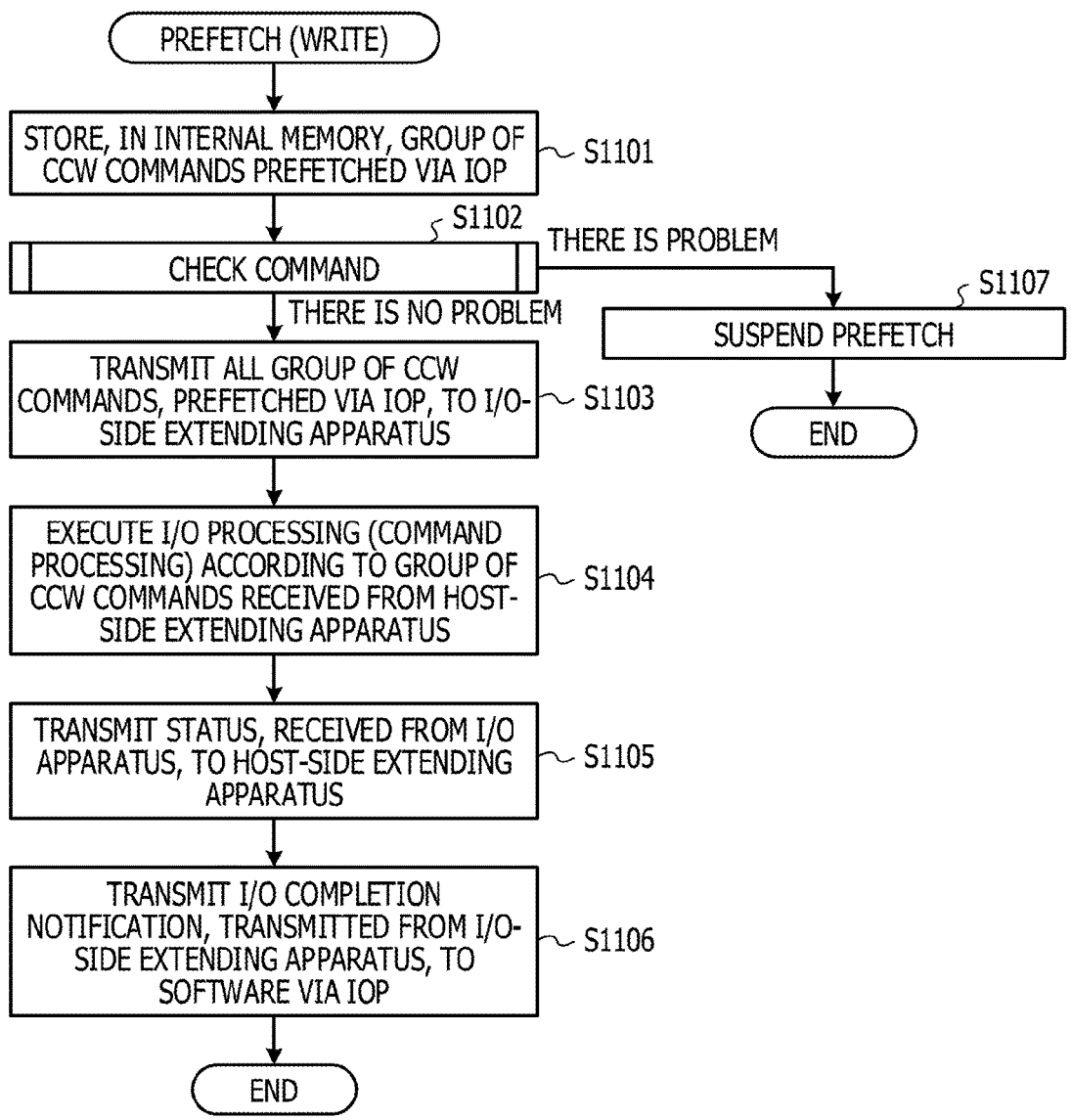
FIG. 11 illustrates exemplary write prefetch processing.

FIG. 11 illustrates exemplary write prefetch processing. The write prefetch processing illustrated in FIG. 11 is executed in step S802 illustrated in FIG. 8, step S902 illustrated in FIG. 9, and step S1002 illustrated in FIG. 10.

When the write prefetch processing is started, in step S1101, the host-side extending apparatus 20 stores, in an internal memory, the group of CCW commands prefetched from the MSU 11 via the IOP 12. Next, in step S1102, the host-side extending apparatus 20 determines the type of CCW commands, and when a plurality of command types is mixed, the host-side extending apparatus 20 performs control in accordance with prefetch control illustrated in FIG. 12, the prefetch control being performed when command types are mixed.

FIG. 12 illustrates exemplary prefetch control when different command types are mixed, that is, when the type of previous (preceding) CCW command and the type of subsequent (following) CCW command differ from each other. In FIG. 12, "continue" indicates that the prefetch operation is continued (or started), and "suspend" indicates that the prefetch operation is suspended and synchronization is performed with a previous CCW command. In a situation in which the prefetch operation is suspended in the same command chain, when a subsequent CCW command satisfies the "continue" condition, the prefetch operation is resumed.

In FIG. 12, "n/a" indicates that indicates that prefetch operation has not been performed and the synchronization processing is continued. Also, when a subsequent NOP command is a last CCW command, processing is performed according to the NOP synchronization processing. When the CCW commands continue in the order "read type: tape apparatus and read"→"NOP"→"write type", the prefetch is suspended at the timing of the write-type fetching.

When a result of the determination in the process in step S1102 indicates that there is no problem with the command type, the process proceeds to step S1103 in which the host-side extending apparatus 20 transmits all the group of CCW commands, prefetched from the MSU 11 via the IOP 12, to the I/O-side extending apparatus 30. Next, in step S1104, the I/O-side extending apparatus 30 issues, to the I/O apparatus 40, an instruction for executing I/O processing (command processing) according to the group of CCW commands received from the host-side extending apparatus 20, and the I/O apparatus 40 executes the I/O processing (command processing).

In step S1105, the I/O-side extending apparatus 30 receives a status regarding the I/O processing (command processing) from the I/O apparatus 40 and transmits the received status to the host-side extending apparatus 20. Subsequently, in step S1106, the host-side extending apparatus 20 transmits an I/O completion notification, transmitted from the I/O-side extending apparatus 30, to the software via the IOP 12.

When a result of the determination in the process in step S1102 indicates that there is a problem with the command type, for example, the prefetch operation is to be suspended, the process proceeds to step S1107 in which the host-side extending apparatus 20 suspends the prefetch operation. The host-side extending apparatus 20 waits for completion of CCW commands before the prefetch operation is suspended and waits for a next CCW command launch.

FIG. 13 illustrates exemplary prefetch processing based on read pre-control, the prefetch processing being executed in step S803 illustrated in FIG. 8. When the prefetch processing based on the read pre-control is started, in step S1301, the host-side extending apparatus 20 stores, in the internal memory, a group of CCW commands prefetched from the MSU 11 via the IOP 12. In step S1302, the host-side extending apparatus 20 determines the type of CCW commands. When command types are mixed, the host-side extending apparatus 20 performs control in accordance with the prefetch control for the case in which command types are mixed, the prefetch control being illustrated in FIG. 12.

When a result of the determination in the process in step S1302 indicates that there is no problem with the command type, the process proceeds to step S1303 in which the host-side extending apparatus 20 transmits the group of CCW commands, prefetched from the MSU 11 via the IOP 12, to the I/O-side extending apparatus 30. Next, in step S1304, the I/O-side extending apparatus 30 issues, to the I/O apparatus 40, an instruction for executing I/O processing (command processing) according to the group of CCW commands received from the host-side extending apparatus 20, and the I/O apparatus 40 executes the I/O processing (command processing).

In step S1305, the I/O-side extending apparatus 30 receives read data from the I/O apparatus 40 and transmits the received read data to the host-side extending apparatus 20. Subsequently, in step S1306, the host-side extending apparatus 20 stores, in an internal buffer, the read data transmitted from the I/O-side extending apparatus 30. In step S1307, the host-side extending apparatus 20 re-fetches the CCW commands one by one from the MSU 11 via the IOP 12 and compares the fetched CCW commands with the stored prefetched group of CCW commands. In this case, the host-side extending apparatus 20 compares the CCW commands as to whether or not all elements thereof match.

In step S1308, the host-side extending apparatus 20 determines whether or not all of the stored prefetched CCW commands matched the re-fetched CCW commands. When the host-side extending apparatus 20 determines that all of the prefetched CCW commands matched the re-fetched CCW commands, the process proceeds to step S1309 in which the host-side extending apparatus 20 outputs the read data stored in the internal buffer, stores the read data in a buffer in the host 10, and transmits an I/O completion notification (a read completion notification) to the software via the IOP 12. When the host-side extending apparatus 20 determines that there is a CCW command that does not match, the process proceeds to step S1310 in which the host-side extending apparatus 20 reports a program check to the software as an unintended event and discards the read data stored in the internal buffer.

When the result of the process in step S1302 indicates that there is a problem with the command type, that is, when it is determined that the prefetch operation is to be suspended, the process proceeds to step S1311 in which the host-side extending apparatus 20 suspends the prefetch operation. The host-side extending apparatus 20 waits for CCW command completion before the prefetch operation is suspended and waits for next CCW command launch.

Figure 14:
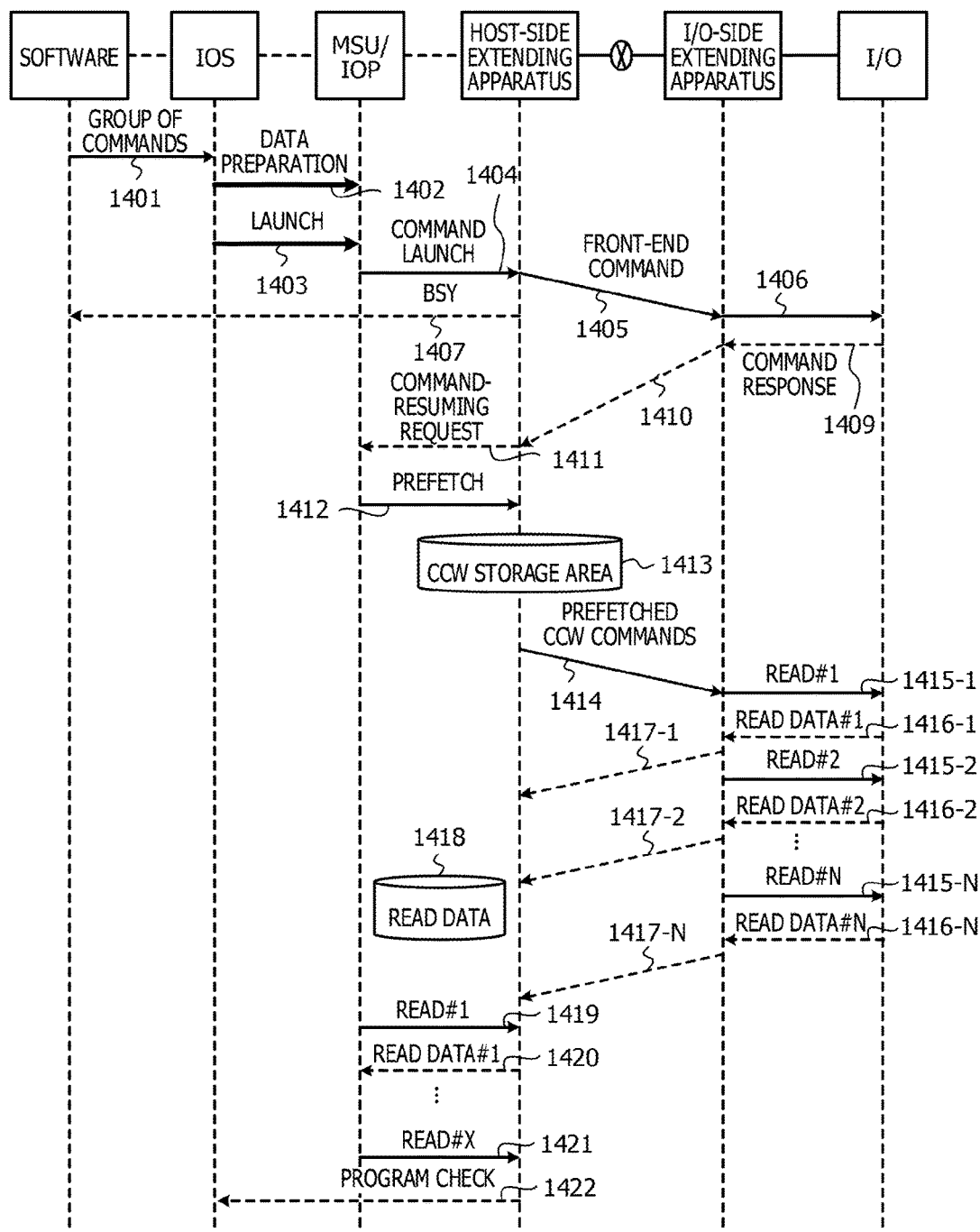
FIG. 14 illustrates exemplary read prefetch processing.

FIG. 14 illustrates an exemplary processing sequence of prefetch processing based on read pre-control. The software that runs on the host transmits a group of commands to the IOS (1401), the IOS prepares, for the MSU/IOP, data including the group of commands (1402), and then issues a launch instruction (1403). Upon receiving the launch instruction, the MSU/IOP transmits the group of commands to the host-side extending apparatus (command launch) (1404).

The host-side extending apparatus transmits the front-end CCW command to the I/O-side extending apparatus (1405), and the I/O-side extending apparatus receives the CCW command and issues the CCW command to the I/O apparatus (1406). Upon transmitting the front-end CCW command to the host-side extending apparatus, the I/O-side extending apparatus returns a response (BSY response) to the software via the MSU/IOP (1407 and 1408). Upon receiving the response, the software clears the response monitor timer.

Upon receiving, from the I/O apparatus, a response to the front-end CCW command (1409), the I/O-side extending apparatus notifies the host-side extending apparatus about the response to the front-end CCW command (1410). Upon being notified about the response to the front-end CCW command, the host-side extending apparatus transmits a command-resuming request (BSY to Free response) (1411). The command-resuming request transmitted from the host-side extending apparatus is transmitted to the software via the MSU/IOP.

Thereafter, the host-side extending apparatus starts prefetch control to prefetch, from the MSU/IOP, the group of CCW commands to be batch-transferred (1412). The host-side extending apparatus stores the prefetched group of CCW commands in an internal memory (a CCW storage area) (1413) and also batch-transfers the group of CCW commands to the I/O-side extending apparatus (1414).

The I/O-side extending apparatus sequentially issues commands (read commands) in the received group of CCW commands to the I/O apparatus (1415-1 to 1415-N). The I/O apparatus executes I/O processing (read processing) corresponding to the commands (read commands), and the read data is output from the I/O apparatus to the I/O-side extending apparatus (1416-1 to 1416-N). Then, the I/O-side extending apparatus transmits the read data to the host-side extending apparatus (1417-1 to 1417-N). The host-side extending apparatus stores the received read data in the internal buffer (1418).

Upon receiving the read data from the I/O-side extending apparatus, the host-side extending apparatus re-fetches the CCW commands one by one and compares the CCW commands with the CCW commands (prefetched CCW commands) stored in the internal memory (the CCW storage area). When the result of the comparison indicates that the re-fetched CCW commands match the CCW commands stored in the internal memory, the host-side extending apparatus outputs the read data stored in the internal buffer and stores the read data in the buffer in the host (1419 and 1420). When the result of the comparison indicates that the re-fetched CCW commands do not match the CCW commands stored in the internal memory, the host-side extending apparatus discards the read data stored in the internal buffer and reports a program check to the software (1421 and 1422).

In the manner described above, the host-side extending apparatus compares CCW commands (read commands), prefetched and output to the I/O-side extending apparatus, with CCW commands (read commands) re-fetched one by one after receiving data from the I/O-side extending apparatus, and when the prefetched commands match the re-fetched commands, the host-side extending apparatus outputs the data, received from the I/O-side extending apparatus, to the host. Thus, even when CCW commands are dynamically overwritten, for example, after prefetch, only legitimate data can be obtained, thus making it possible to protect data.

A sense function is a function for notifying the software that runs on the host about information regarding an apparatus-side failure, abnormality, that occurs in the I/O apparatus. Owing to constraints in protocols, it is difficult to apply timeout-inhibition measures using a pseudo response in the host-side extending apparatus to a sense (sense) command for obtaining information regarding a failure, an abnormality, or the like from the I/O apparatus. In the present embodiment, the I/O-side extending apparatus serves as a proxy to issue a sense command, obtains sense data indicating information regarding a failure, abnormality, or the like from the I/O apparatus, and notifies the host side about the information.

Figure 15:
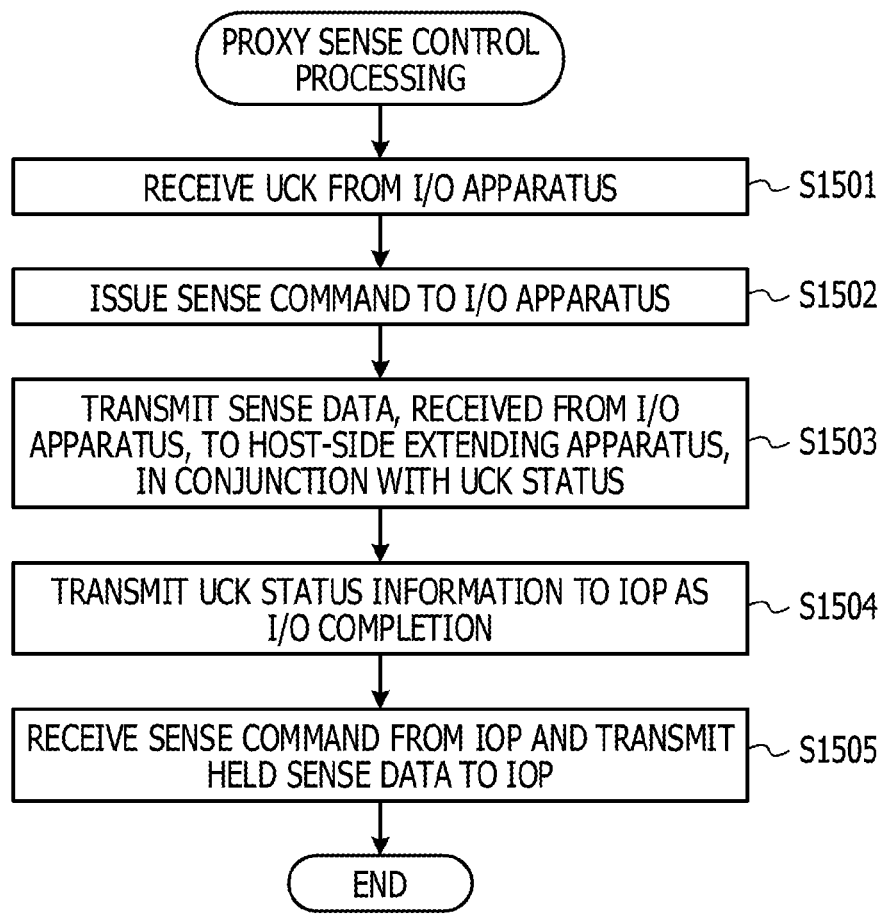
FIG. 15 illustrates exemplary proxy sense control processing.

FIG. 15 illustrates exemplary proxy sense control processing. In step S1501, the I/O-side extending apparatus 30 receives a unit-check (UCK) status notification from the I/O apparatus 40. Then, in step S1502, the I/O-side extending apparatus 30 issues a sense command to the I/O apparatus 40. Upon receiving sense data from the I/O apparatus 40 as a response to the issued sense command, the I/O-side extending apparatus 30 stores the received sense data in an internal buffer. In step S1503, the I/O-side extending apparatus 30 transmits the received sense data, together with a UCK status, to the host-side extending apparatus 20.

The host-side extending apparatus 20 receives the UCK status and the sense data from the I/O-side extending apparatus 30, and in step S1504, the host-side extending apparatus 20 transmits the UCK status to the IOP 12 as I/O completion. Subsequently, in step S1505, upon receiving the sense command from the IOP 12, the host-side extending apparatus 20 transmits the sense data to the IOP 12 and ends the processing.

Figure 16:
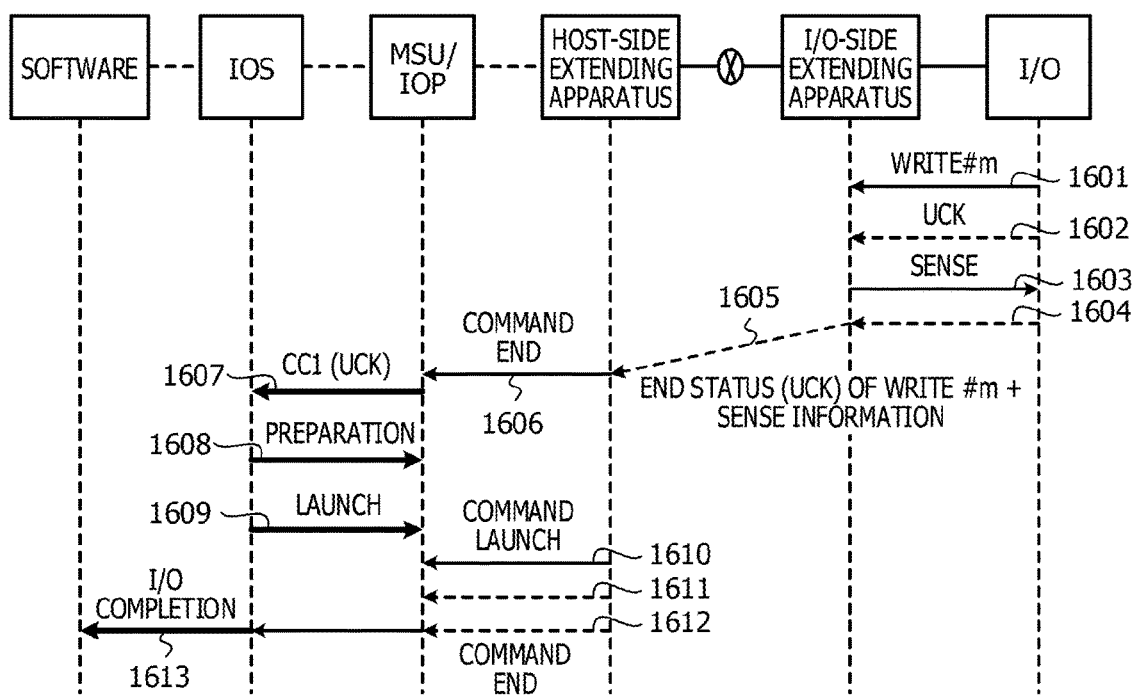
FIG. 16 illustrates an exemplary processing sequence of the proxy sense control processing.

FIG. 16 illustrates an exemplary processing sequence of proxy sense control processing. In response to a command from the host side, the I/O-side extending apparatus issues, for example, a write command to the I/O apparatus (1601), and when a failure, an abnormality, or the like occurs in the I/O apparatus in processing therefor, the I/O apparatus transmits a UCK status notification to the I/O-side extending apparatus (1602). Upon receiving the UCK status notification from the I/O apparatus, the I/O-side extending apparatus issues a sense command to the I/O apparatus (1603).

The I/O apparatus returns, to the I/O-side extending apparatus, sense data corresponding to the issued sense command (1604), and the I/O-side extending apparatus transmits an end status (UCK status) of the write command and the sense data to the host-side extending apparatus (1605). Upon receiving the end status (UCK status) and the sense data from the I/O-side extending apparatus, the host-side extending apparatus notifies the MSU/IOP about command end (1606), and the MSU/IOP notifies the IOS about the command with which the UCK status occurred (1607).

The notified IOS prepares, for the MSU/IOP, data according to the sense command (1608) and issues a launch instruction (1609). Upon receiving the launch instruction, the MSU/IOP transmits the sense command to the host-side extending apparatus (command launch) (1610). In response to the sense command, the host-side extending apparatus transmits held sense data to the MSU/IOP (1611). Thereafter, the host-side extending apparatus notifies the MSU/IOP about command end (1612), and the MSU/IOP notifies the software on the host about I/O completion (1613).

Figure 17:
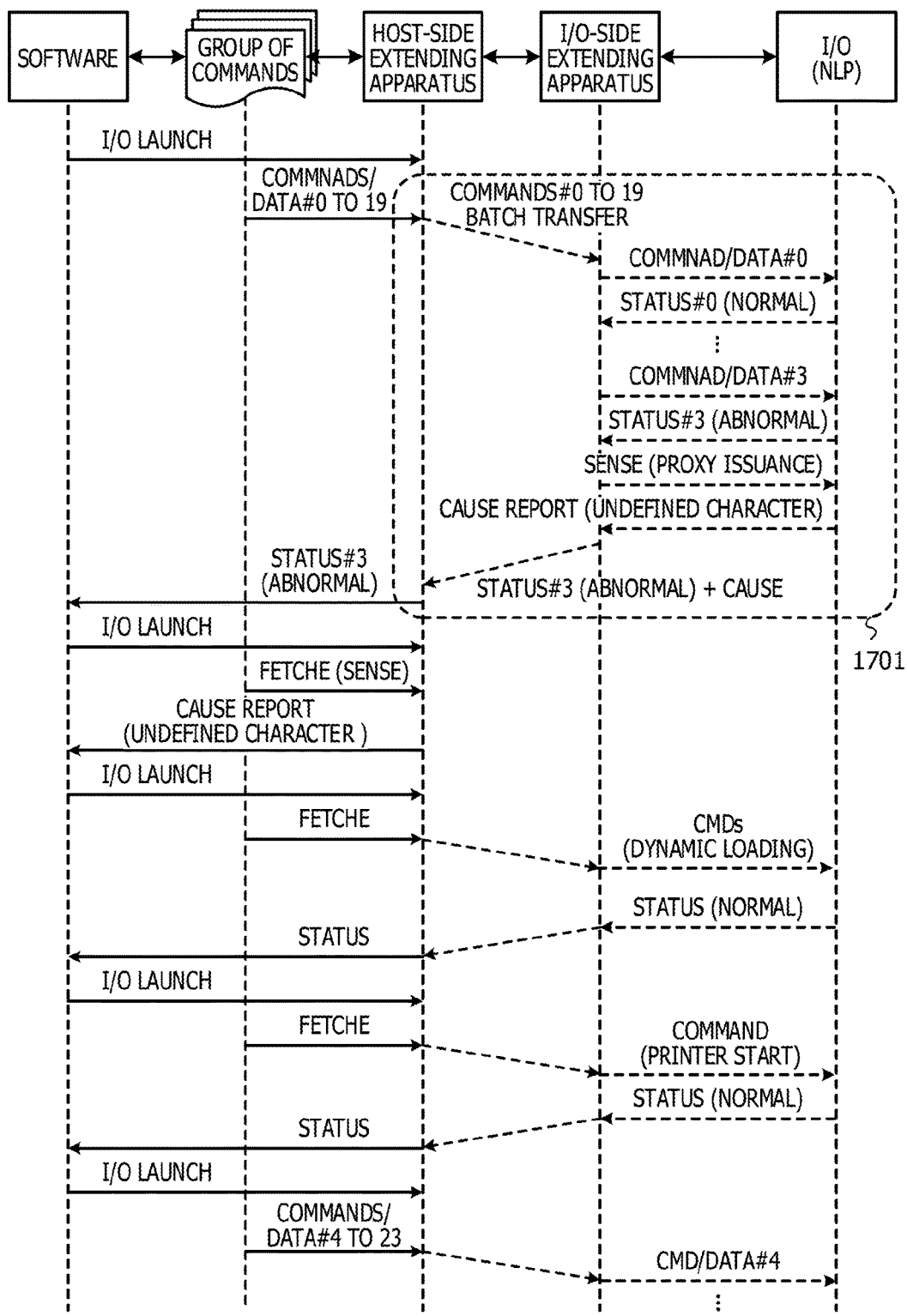
FIG. 17 illustrates exemplary operations in the transmission and reception system.

As described above, when a failure or an abnormality occurs in the I/O apparatus, the I/O-side extending apparatus serves as a proxy to issue a sense command to make it possible to obtain sense data, for example, as illustrated in 1701 in FIG. 17. In addition, in the command processing (I/O processing) based on the prefetch control in the present embodiment, synchronization is achieved among the software, the extending apparatuses, and the I/O apparatus, thus making it possible to issue a recovery request with the status of a command with which a failure or abnormality occurs in the I/O apparatus and making it possible to realize recovery processing that does not depend on the type of software.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control method for a transmission and reception system, the control method comprising:

receiving, by a transmitting apparatus coupled to an information processing apparatus, which transmits a plurality of command groups each including a plurality of commands to an input and output apparatus, and coupled to a receiving apparatus, which is coupled to the input and output apparatus, through a network, a first command group including a plurality of commands from the information processing apparatus;

transmitting, by the transmitting apparatus, a leading command of the plurality of commands in the first command group to the receiving apparatus;

transmitting, by the transmitting apparatus, a first response to the information processing apparatus in response to the leading command received from the information processing apparatus;

receiving, by the transmitting apparatus, a second response from the receiving apparatus in response to the leading command;

obtaining, by the transmitting apparatus, a second command group including a plurality of commands from the information processing apparatus after receiving the second response;

batch-transferring the plurality of commands in the first command group and the plurality of commands in the second command group to the receiving apparatus without making a third response for each of the plurality of commands in the first command group and the plurality of commands in the second command group to the information processing apparatus by the transmitting apparatus;

issuing, by the receiving apparatus, the plurality of commands in the first command group and the plurality of commands in the second command group to the input and output apparatus; and notifying, by the receiving apparatus, in a case where the plurality of commands in the first command group and the plurality of commands in the second command group are batch-transferred from the transmitting apparatus, the transmitting apparatus about processing completion when processing of all of the plurality of commands in the first command group and the plurality of commands in the second command group is completed.

2. The control method according to claim 1, wherein, when the plurality of commands in the first command group and the plurality of commands in the second command group are batch-transferred from the transmitting apparatus, the receiving apparatus notifies the transmitting apparatus about status information of a command in which an abnormality occurs in a processing of the command from among the plurality of commands in the first command group and the plurality of commands in the second command group.

3. The control method according to claim 1, wherein the transmitting apparatus stores, in an internal memory, the plurality of commands in the first command group and the plurality of commands in the second command group; and the transmitting apparatus compares the plurality of commands in the first command group and the plurality of commands in the second command group stored in the internal memory with a plurality of commands re-obtained from the information processing apparatus, and outputs, to the information processing apparatus, data from the input and output apparatus, when the plurality of commands in the first command group and the plurality of commands in the second command group stored in the internal memory matches the plurality of re-obtained commands.

4. The control method according to claim 1, wherein, in response to an reception of a notification indicating that an abnormality occurred from the input and output apparatus, the receiving apparatus issues, to the input and output apparatus, a command that obtains information regarding the abnormality.

5. The control method according to claim 1, wherein, in a case where the transmitting apparatus transfers the plurality of commands in the first command group and the plurality of commands in the second command group to the receiving apparatus, the transmitting apparatus resumes the transfer of the plurality of commands in the first command group and the plurality of commands in the second command group after receiving the second response to the leading command in the plurality of commands in the first command group from the receiving apparatus.

6. The control method according to claim 1, wherein the plurality of commands in the first command group and the plurality of commands in the second command group are batch-transferred using a transfer system that complies with an FC-SB-2 standard.

7. A transmitting apparatus comprising:
a memory; and
a processor coupled to the memory,
the transmitting apparatus is coupled to an information processing apparatus, which transmits a plurality of command groups each including a plurality of commands to an input and output apparatus, and is coupled to a receiving apparatus, which is coupled to the input and output apparatus, through a network,
the processor is configured to:
receive a first command group including a plurality of commands from the information processing apparatus;
transmit a leading command of the plurality of commands in the first command group to the receiving apparatus;
transmit a first response to the information processing apparatus in response to the leading command received from the information processing apparatus;
receive a second response from the receiving apparatus in response to the leading command;
obtain a second command group including a plurality of commands from the information processing apparatus after receiving the second response; and
batch-transfer the plurality of commands in the first command group and the plurality of commands in the second command group to the receiving apparatus without making a third response for each of the plurality of commands in the first command group and the plurality of commands in the second command group to the information processing apparatus.

8. The transmitting apparatus according to claim 7, wherein the processor:

stores, in an internal memory, the plurality of commands in the first command group and the plurality of commands in the second command group; and compares the plurality of the plurality of commands in the first command group and the plurality of commands in the second command group stored in the internal memory with a plurality of commands re-obtained from the information processing apparatus, and outputs, to the information processing apparatus, data from the input and output apparatus, when the plurality of commands in the first command group and the plurality of commands in the second command group stored in the internal memory matches the plurality of re-obtained commands.

9. The transmitting apparatus according to claim 7, wherein, in a case where the processor transfers the plurality of commands in the first command group and the plurality of commands in the second command group to the receiving apparatus, the processor resumes the transfer of the plurality of commands in the first command group and the plurality of commands in the second command group after receiving the second response to the leading command in the plurality of commands in the first command group from the receiving apparatus.

10. The transmitting apparatus according to claim 7, wherein the plurality of commands in the first command group and the plurality of commands in the second command group are is batch-transferred using a transfer system that complies with an FC-SB-2 standard.

11. A receiving apparatus comprising:
a memory; and
a processor coupled to the memory,
the receiving apparatus is coupled to an input and output apparatus and is coupled to a transmitting apparatus coupled to an information processing apparatus, which transmits a plurality of command groups each including a plurality of commands to the input and output apparatus, through a network,
the processor is configured to:
receive a leading command of a plurality of commands in a first command group, which is transmitted from the information processing apparatus, from the transmitting apparatus which transmits a first response to the information processing apparatus in response to the leading command;
transmit a second response to the transmitting apparatus in response to the leading command;
receive the plurality of commands in the first command group and a plurality of commands in a second command group which are batch-transferred from the transmitting apparatus, the second command group being transmitted from the information processing apparatus to the transmitting apparatus without making a third response for each of the plurality of commands in the first command group and the plurality of commands in the second command group to the information processing apparatus after the second response is received in the transmitting apparatus;
issue the plurality of commands in the first command group and a plurality of commands in a second command group from the transmitting apparatus to the input and output apparatus; and
notify, in a case where the plurality of commands in the first command group and the plurality of commands in the second command group are batch-transferred from the transmitting apparatus, the transmitting apparatus about processing completion when processing of all of the plurality of commands in the first command group and the plurality of commands in the second command group is completed.

12. The receiving apparatus according to claim 11, wherein, when the plurality of commands in the first command group and the plurality of commands in the second command group are batch-transferred from the transmitting apparatus, the processor notifies the transmitting apparatus about status information of a command in which an abnormality occurs in a processing of the command from among the plurality of commands in the first command group and the plurality of commands in the second command group.

13. The receiving apparatus according to claim 11, wherein, in response to an reception of a notification indicating that an abnormality occurred from the input and output apparatus, the processor issues, to the input and output apparatus, a command that obtains information regarding the abnormality.

14. The receiving apparatus according to claim 11 wherein the plurality of commands in the first command group and the plurality of commands in the second command group are batch-transferred using a transfer system that complies with an FC-SB-2 standard.

* * * * *